US005592173A

United States Patent [19]
Lau et al.

[11] Patent Number: 5,592,173
[45] Date of Patent: Jan. 7, 1997

[54] GPS RECEIVER HAVING A LOW POWER STANDBY MODE

[75] Inventors: Chung Y. Lau, Sunnyvale; Dominic G. Farmer, Milpitas; Kreg A. Martin; Eric B. Rodal, both of Cupertino, all of Calif.

[73] Assignee: Trimble Navigation, Ltd, Sunnyvale, Calif.

[21] Appl. No.: 276,886

[22] Filed: Jul. 18, 1994

[51] Int. Cl.⁶ .............................. G01S 5/02; G06F 1/00; H04B 1/16
[52] U.S. Cl. .......................... 342/357; 364/707; 455/343; 455/231
[58] Field of Search ........................... 342/357; 455/343, 455/230, 231; 364/707

[56] References Cited

U.S. PATENT DOCUMENTS

| | | | |
|---|---|---|---|
| 4,449,248 | 5/1984 | Leslie et al. | 455/343 |
| 5,101,510 | 3/1992 | Duckeck | 455/186 |
| 5,128,938 | 7/1992 | Borras | 455/343 |
| 5,291,542 | 3/1994 | Kivari et al. | 379/58 |
| 5,418,537 | 5/1995 | Bird | 342/357 |
| 5,448,773 | 9/1995 | McBurney et al. | 455/343 |

Primary Examiner—Gregory C. Issing
Attorney, Agent, or Firm—David R. Gildea

[57] ABSTRACT

A GPS receiver having a normal mode to receive GPS satellite signals and to provide location information, and a low power standby mode. A microprocessor system in the GPS receiver causes the GPS receiver to alternate between the normal mode and the low power standby mode in order to reduce the average power consumption in the GPS receiver. In the normal mode a GPS antenna receives GPS satellite signals, the GPS frequency downconverter converts the frequency of the GPS satellite signals to an intermediate frequency, a digital signal processing system processes the intermediate frequency to provide GPS satellite signal correlation information. The microprocessor system processes the correlation information and provides location information to a user. In the standby mode, the operating power is inhibited in the GPS antenna and the GPS frequency downconverter, the system clock is inhibited in the digital processing system, and the microprocessor clock is inhibited in the microprocessor system.

31 Claims, 4 Drawing Sheets

GPS RECEIVER HAVING A LOW POWER STANDBY MODE

FIELD OF THE INVENTION

This invention generally relates to Global Positioning System receivers and more specifically relates to techniques to reduce power consumption in a Global Positioning System receiver.

BACKGROUND OF THE INVENTION

Global Positioning System is a navigation and position service offering worldwide, 24 hour coverage. The Global Positioning System (GPS) includes GPS satellites to broadcast GPS satellite signals, control stations to monitor and control the satellites, and a GPS receiver. The GPS receiver demodulates the GPS satellite signals, calculates a pseudorange for each GPS satellite that it receives, and computes a location and a time of observation. A GPS antenna that is a part of the GPS receiver must have a line of sight to a GPS satellite to receive a GPS signal from that satellite.

GPS satellites broadcast two types of location information, P code and C/A code. P-code is intended for use by the United States military and by agencies specifically authorized by the United States military. P-code is encrypted by a Y-code to prevent its unauthorized use. C/A is available to everyone without charge. The C/A code is carried on an L1 carrier at approximately 1.575 GHz. Each GPS satellite modulates C/A code information with a PRN sequence that is unique to the individual GPS satellite. The GPS receiver receives a GPS signal that is a superposition of the GPS satellite signals from all the GPS satellites having a line of sight. The unique PRN sequence enables the GPS receiver to differentiate the GPS signal from each GPS satellite. The GPS receiver computes a pseudorange for each GPS satellite by comparing the time of arrival of the PRN sequence against an internal time standard. The carrier frequency for each GPS satellite signal will vary according to Doppler shift from motion of the GPS satellite and GPS receiver. A description of GPS C/A code is set forth in GPS Interface Control Document ICD-GPS-200, published by Rockwell International Division, Revision A, 26 Sep. 1984, which is incorporated by reference herein.

Commercial GPS receivers are now used for many applications involving timing, navigation, tracking, surveying, and geographical information systems. Some of these applications require that the GPS receiver be carried by an individual user. Typically, where the GPS receiver is carded by an individual user, the user will not have operating access to the power grid or other external power source. Existing GPS receivers intended for handheld or carried applications use batteries for a power source. A limitation of existing GPS receivers intended for carried applications is that the power consumption requires frequent changing or charging of batteries, or large and heavy batteries. Power consumption in existing handheld GPS receivers such as those available from Trimble, Garmin, Sony, Motorola, Panasonic, Rockwell, and Magellan is typically one to two watts. These GPS receivers operate for two to six hours using three to six AA size Alkaline or Nickel Cadmium batteries as recommended by the manufacturers. Existing survey GPS receivers intended to be luggable, such as a Trimble 4000SST, operate for 4 to 8 hours using a battery weighing a few pounds.

Some users extend use time in a GPS receiver by manually cycling power. A limitation of manually cycling power is that users often forget to cycle power off and do not realize their error until the batteries are depleted. GPS receivers are also used or being considered for use by the United States Forest Service to track elk, by marine biologists to track elephant seals (when the seals are on the water surface or on land), and by the FBI to track crime suspects and parolees. A second limitation in these applications is that no user is present to manually cycle power.

A handheld GPS receiver available with a model name Pronav 100 uses six disposable alkaline batteries or a rechargeable battery pack. It also allows the use of an external power source to provide continuous navigation microprocessor updates. The Pronav 100 has a "Battery Saver Mode" operable on six alkaline batteries for fourteen hours with a "QuickFix Mode" which automatically completes four location fixes per hour. Under most dynamic circumstances, use of QuickFix to obtain four position fixes per hour is not satisfactory. The usefulness of the Pronav 100 is limited because the length of battery life is likely to be greatly shortened when the limited operations allowable under the "Battery Saver Mode" or "QuickFix Mode are not sufficient to satisfy the position accuracy requirements.

Another handheld GPS receiver, the Magellan NAV 1000, is powered by six AA alkaline batteries. For the purpose of reducing power consumption and extending the life of the batteries, a "PowerSaveR" mode is provided under which the receiver can be manually turned on to compute a location fix. After the location fix is stored as the last fix, the receiver turns itself off. The receiver can also operate continuously and automatically revert to PowerSaveR mode when a "battery low" condition is detected. The NAV 1000 also allows the units to operate on an external power source. The user's manual includes the instruction not to collect almanac information in handheld operation using the battery because of the concern for battery life. The NAV 1000 is probably less useful due to this limitation. The Trimble Ensign GPS receiver uses automatic on/off power cycling to the RF circuits to provide a mode where location fixes are available at less frequent intervals with less power consumption. However, the maximum off time is less than five seconds which severely limits the power savings.

Typical GPS receivers include the GPS antenna, a GPS engine, one or more user input devices, one or more user output devices, a user microprocessor system to operate the input devices and the output devices, and a power supply. Some existing low power GPS receivers use a Liquid Crystal Display (LCD) for the user output device, and electro-mechanical or touchscreen key switches. Electromechanical key switches, where pressing a key completes an electrical connection, are often preferred for low power applications because no power is used except when a key is pressed. An LCD consumes little power in a display but consumes substantial power in a backlight if a backlight is used. Low power GPS receivers having backlit displays generally have a capability to turn off the backlight. The GPS engine includes a GPS frequency downconverter, a Digital Signal Processing (DSP) system having one or more DSP channels, a GPS microprocessor system, and a reference frequency oscillator. Some handheld GPS receivers combine the user microprocessor system and the GPS microprocessor system.

GPS receivers include custom digital and analog circuitry. Most digital circuitry in existing GPS receivers use a generation of components intended to be powered at 5 volts. New generations of GPS engines use components intended to be powered at 3.3 volts. The use of 3.3 volt designs in place of 5 volt designs is expected to reduce the power consumption in the digital circuitry in the GPS receivers by a factor of approximately 2. A second method being used in new generations of GPS receivers to reduce power is higher levels of integration. In general, less power is consumed in a single chip than in two or more chips accomplishing the same function because parasitic capacitances, which require power to charge and discharge, are lower within an integrated circuit than on a printed circuit board or other external wiring system connecting the chips. Existing low power GPS engines use Complementary Metal Oxide Silicon (CMOS) for digital circuitry because CMOS allows high circuit density and consumes less average power than other digital circuit technologies such as Transistor Transistor Logic (TTL), Emitter Coupled Logic (ECL), or N type Metal Oxide Silicon (NMOS). A CMOS circuit consumes power primarily when changing digital states and consumes very little power when the circuit is quiescent. Most digital systems are synchronous where changes in digital states are driven by a clock. Where no clock is present in a synchronous system, the CMOS circuit is quiescent.

Gallium Arsenide (GaAs) and Silicon technologies are used for analog RF circuitry in existing GPS antennas and GPS engines. In either GaAs or Silicon, higher levels of integration reduces power consumption because parasitic capacitances, which require power to charge and discharge, are lower within an integrated circuit than on a printed circuit board or other external wiring system. New GPS receivers are using new RF is designs and fabrication processes to achieve higher levels of integration to reduce power consumption.

Static microprocessors such as the Motorola 68300 series exist that have a low power quiescent mode when not clocked. The microprocessor is placed in the low power quiescent or standby mode in response to executing a "sleep" instruction in software. At least two types of processor sleep instructions are provided to inhibit the clocking of the microprocessor—a "stop" instruction for temporarily disabling a microprocessor clock source and a "wait" instruction for inhibiting a microprocessor clock signal from being passed. The clock signal is made available again by the receipt of a wakeup interrupt signal. Although static microprocessors have been around for a few years, and have been s used in a Trimble "Gamma" GPS receiver, no GPS receiver is known to use the sleep instruction in order to reduce power for a standby mode.

Many U.S. patents disclose power saving methods for signal receivers such as pagers and general communication radios. Basically, a receiver is maintained in a standby state with low power consumption. Either a hardware or a software system is provided to monitor incoming signals. The receiving system is activated when an incoming signal intended for the receiver is detected. The power is automatically turned off after reception of the signals is complete. In some systems, one receiver remains on to reawaken a second receiver. Although the general concept of power saving is widely known, the known methods are not of practical use to a GPS receiver. Unlike the signals received by pagers and communication radios, the GPS satellite signals are intended to be received and used on a continuous basis. Even when not processing GPS satellite signals, GPS receivers are kept busy maintaining tables of visibility, almanacs, ephemeris, and signal strengths for GPS satellites and implementing navigation algorithms. GPS receivers, unlike pagers and communication radios, typically require twenty seconds to three minutes to re-acquire the GPS signal after power is turned on. Unlike pagers and communication radios, where the receiver initiates a request for a response from a user when a signal is received, a GPS user initiates a request for a response from the GPS receiver when the user needs location. Therefore, the methods of maintaining a standby state and passively waiting for the arrival of a signal to save battery power, as disclosed in the U.S. patents for general signal receiving systems, are not useful for reducing power consumption in a GPS receiver.

Some GPS receivers also include dead reckoning devices to enable the GPS receiver to continue to compute and to display new locations when lines of sight to GPS satellite signals are blocked. Existing GPS receivers do not make use of dead reckoning devices to conserve power or to reawaken the GPS receiver after a standby time.

The combination of all existing or known techniques for reducing power consumption in GPS receivers is expected to reduce power by a factor of approximately 3 or 4 to approximately 250 to 750 milliwatts resulting in an increase in battery life to approximately 6 to 24 hours. While users of handheld GPS receivers will appreciate this increase in battery life, a GPS receiver is needed for carried applications that will operate with still lower power for still longer periods of time without recharging or replacing batteries, while providing location fixes at frequent intervals.

SUMMARY OF THE INVENTION

In a first object, the invention is a GPS receiver having two modes, a normal mode where GPS satellite signals are acquired and tracked and location is computed, and a standby mode where GPS satellite signals are not acquired, tracked, or displayed but where power consumption is reduced by an order of magnitude or more. The GPS receiver includes the following elements: a GPS antenna to receive GPS satellite signals; a GPS frequency downconverter to convert the GPS satellite signals to an intermediate frequency; a Digital Signal Processing (DSP) system to process the intermediate frequency and provide correlation information; one or more user input devices to receive user inputs; a microprocessor system to receive and to process the correlation information, to process the user inputs, to receive, process, and issue digital signals to control the elements of the GPS receiver, and to provide location information to one or more user output devices; a system clock source to provide clock signals to the GPS frequency downconverter and the DSP system; and a power supply to supply power to the elements of the GPS receiver. The system clock source is optionally a reference frequency oscillator included in the GPS receiver or is an external source. The GPS receiver optionally includes dead reckoning devices to provide direction information or change of location information.

In a second object, the GPS receiver includes a power controller to control the passing of power from the power supply to a recipient device including at least one of the GPS antenna, the GPS frequency downconverter, one or more user input devices, and one or more user output devices. The power controller under the control of the microprocessor system passes power to the recipient device during the normal mode and inhibits power to the recipient device during the low power standby mode.

In a third object, the DSP system includes at least one clock enable register, controlled by the microprocessor system, to enable and to inhibit clock signals within the DSP system for the normal mode and the standby mode, respectively. The DSP system is designed with Complementary Metal On Silicon (CMOS) circuits having very low power consumption in a quiescent mode compared to power consumption when driven by a clock signal to change between digital states.

In a fourth object, the microprocessor system includes a static microprocessor having the capability of inhibiting a microprocessor clock signal by executing a sleep instruction. The microprocessor system is designed with Complementary Metal On Silicon (CMOS) circuits having very low power consumption in a quiescent mode compared to power consumption when driven by a clock signal to change between digital states. When the sleep instruction is executed, the microprocessor system enters low power standby mode.

In a fifth object, a wakeup interrupt signal received by the microprocessor system causes the GPS receiver to exit standby mode and to enter normal mode. The wakeup interrupt signal is provided by a real time clock (RTC), by one or more input devices operated by a user, or by an optional dead reckoning device.

In a sixth object, the GPS receiver alternates between the normal mode and the low power standby mode, the average power consumption over time being reduced to the time weighted average of the power consumption in normal mode and the power consumption in standby mode.

In a seventh object, the GPS receiver includes a selection means to select a time duration for standby mode. The selection means selects a standby mode time duration based upon an intended user application, variables that are measured by the GPS receiver during normal operation, and variables requested by the user through the user input devices. Time duration of the normal mode includes time required to re-acquire the GPS satellite signals, compute a new location, and for the microprocessor system to update status of the GPS satellite signals. During standby mode, a user may provide a wakeup interrupt to override the standby mode time duration and to cause the GPS receiver to enter the normal mode. The user may also terminate the normal mode to cause the GPS receiver to enter standby mode.

These and other objects and advantages of the present invention will no doubt become obvious to those skilled in the art after having read the following detailed description of the preferred embodiment.

DETAILED DESCRIPTION OF THE INVENTION

Figure 1:
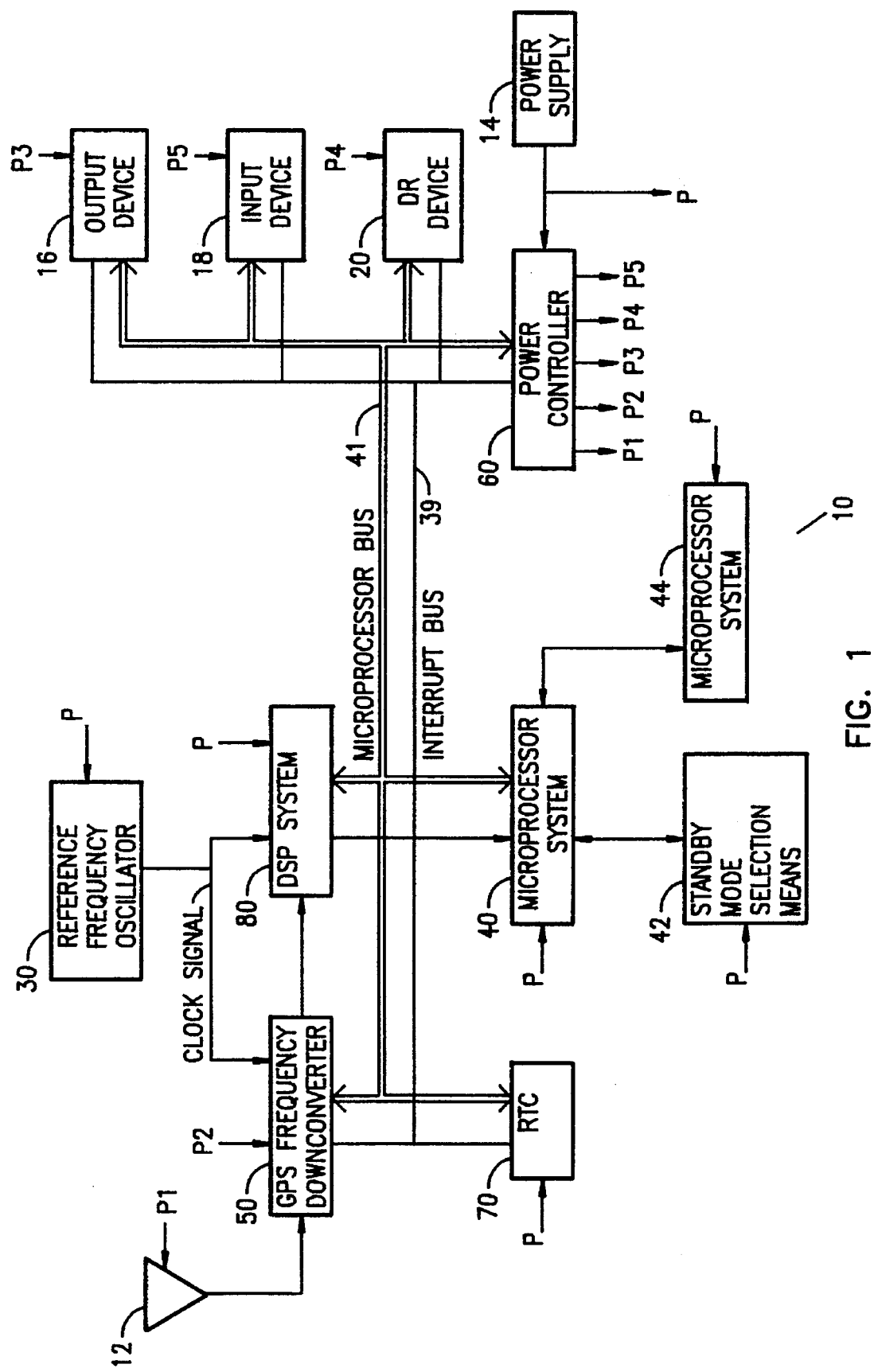
FIG. 1 is a block diagram illustrating an embodiment of a GPS receiver according to the invention.

FIG. 1 illustrates a block diagram of an embodiment of a GPS receiver 10 to receive GPS satellite signals from one or more GPS satellites having a line of sight to a GPS antenna 12 and to determine a location of the GPS antenna 12 and a time of observation. The GPS receiver 10 has a normal mode where GPS satellite signals are acquired and tracked and where location information is provided and a low power standby mode where little or no power is consumed. The GPS receiver 10 includes one or more input devices 16 to receive requests from a user, one or more output devices 18 to display information to a user, and optionally one or more dead reckoning devices 20 to provide direction information or change of location information. The GPS antenna 12 receives the GPS satellite signals and provides a GPS antenna signal having a frequency of approximately 1.575 GHz and including PRN encoded C/A code modulation. A GPS frequency downconverter 50 receives and downconverts the GPS antenna signal a GPS intermediate frequency (IF) signal suitable for digital processing. A Digital Signal Processing (DSP) system 80 receives the GPS IF signal from the GPS frequency downconverter 50 and provides digital signals representing correlation information to a microprocessor system 40. A reference oscillator 30 provides a system clock signal 31 to the frequency downconverter 50 and the DSP system 80. Optionally, the system clock is provided by an external source. The user input devices 18 have associated labels to enable a user to know how to request an operation of the GPS receiver 10. In one embodiment, the labels are hard or permanent. Alternatively, the labels are soft or changed by the user according to a menu of operations.

The microprocessor system 40 includes a microprocessor capable of executing a pre-determined set of instructions a memory, pre-coded software instructions and data stored in the memory, an interrupt receiver, and associated hardware. The microprocessor system 40 operates in a conventional manner to receive digital signals including information, to process the information by executing the pre-coded software stored in the memory, and to issue digital signals to control the elements of the GPS receiver 10. A microprocessor clock source 44, under control of the microprocessor system 40, supplies a microprocessor clock signal to the microprocessor system 40. The microprocessor system 40 receives digital signals representing correlation information from the DSP system 80 and issues digital signals representing location, rate of change of location, direction, and/or time to the output devices 16. A microprocessor bus 41 carries digital signals between the microprocessor system 40 and the elements of the GPS receiver 10. An interrupt bus 39 carries digital signals representing interrupt semaphores from the elements of the GPS receiver 10 to the microprocessor system 40. The microprocessor is a Motorola CPU32 having in its instruction set a "sleep" instruction that inhibits the microprocessor clock signal by temporarily disabling the clock source or by inhibiting the clock signal. The microprocessor system 40 retains the capability of receiving and processing an interrupt signal when a sleep instruction has been executed even though the microprocessor system is not being driven by a clock signal. In normal mode, circuits in the microprocessor system 40 are driven by the microprocessor clock signal to change digital states. When a sleep instruction is executed, the circuits in the microprocessor system 40 are quiescent. The microprocessor system 40 uses Complementary Metal Oxide Silicon (CMOS) circuits that consume substantially less power when quiescent than when driven by a clock signal to change digital states. The microprocessor system 40 enters low power standby mode when it executes a sleep instruction and enters normal mode when a wakeup interrupt signal is received.

A selection means 42, controlled by the microprocessor system 40, uses information based on the intended user application of the GPS receiver 10, variables measured by the GPS receiver 10, and variables received from the user input devices to calculate a time duration for a standby mode. The selection means 42 includes and executes pre-coded software instructions stored in the memory in the microprocessor system 40. The standby mode time duration is converted to an RTC count number and passed to a real time clock (RTC) 70 before a low power standby mode is initiated. The RTC 70, including a RTC clock source, counts cycles generated by the RTC clock source and then issues a wakeup interrupt signal to initiate normal mode when the cycle count equals the RTC count number provided by the microprocessor system 40.

A power supply 14 supplies operating power to the reference frequency oscillator 30, the microprocessor system 40, the selection means 42, the microprocessor clock 44, the RTC 70, and a power controller 60. The power controller 60 is controlled by the microprocessor system 40 to pass or to inhibit power to at least one of the following: the GPS antenna 12 at P1, the GPS frequency downconverter 50 at P2, the one or more output devices 16 at P3, the one or more input devices 18 at P5, and the one or more optional dead reckoning devices 20 at P4. At least one input device 18, such as a key switch, continues to receive power so that a user can terminate low power standby mode on request by pressing at least one key. In an alternative embodiment, an optional dead reckoning device 20 continues to receive power to generate an interrupt signal to terminate low power standby mode. In normal mode, the power controller 60 passes power to the above elements of the GPS receiver 10. In low power standby mode the power controller 60 inhibits power by providing output voltages approximately equal to zero volts or ground voltage, by providing an open circuit so that current cannot pass, or by a combination of ground voltages and open circuits.

Figure 2:
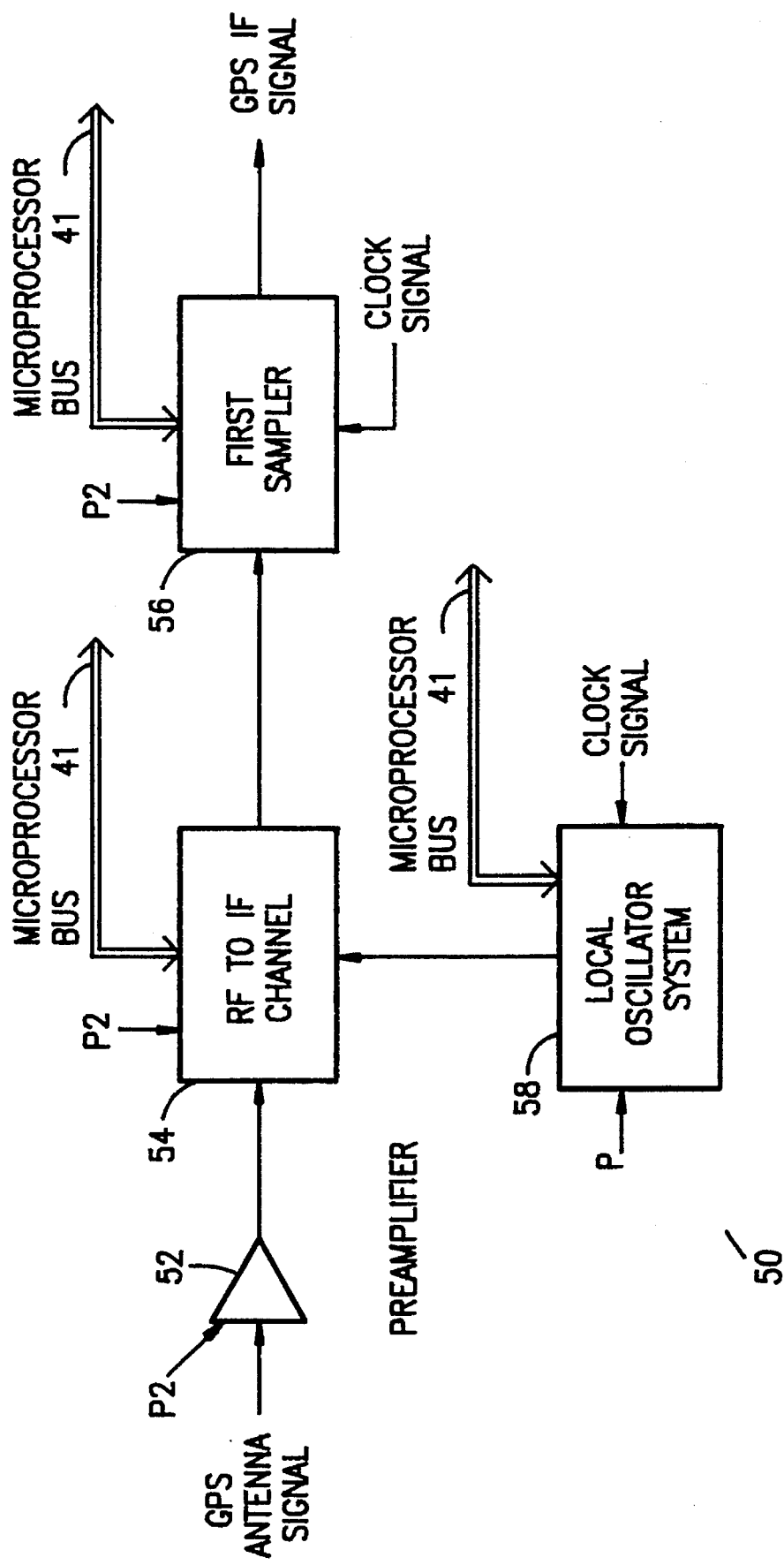
FIG. 2 is a block diagram illustrating an embodiment of a GPS frequency downconverter section of the GPS receiver according to the invention.

FIG. 2 illustrates a block diagram of the GPS frequency downconverter 50. The GPS frequency downconverter 50 has a normal mode where the GPS frequency downconverter 50 provides a GPS IF signal to the DSP system 80 and a low power standby mode where the GPS frequency downconverter 50 does not provide the GPS IF signal and where little or no power is consumed. The GPS frequency downconverter 50 uses radio frequency (RF) analog integrated circuit design techniques and fabrication processes using primarily Silicon NPN transistors with 12 GHz $F_t$. In alternative embodiments, the GPS frequency downconverter 50 may use Gallium Arsenide (GaAs) Field Effect Transistor (FET) active devices, or uses a combination of Silicon and GaAs transistors.

In the normal mode a preamplifier 52 receives the GPS antenna signal at a frequency of approximately 1.575 GHz and issues an amplified signal to an RF to IF channel 54. In an alternative embodiment, a preamplifier in the GPS antenna 12 eliminates the requirement for the preamplifier 52. Typically, a preamplifier in the GPS antenna 12 and/or the preamplifier 52 is required in order to provide good signal to noise ratios for the GPS IF signal. A local oscillator system 58 receives the system clock signal at one frequency from the reference frequency oscillator 30 or external clock source and provides one or more local oscillator signals at one or more other frequencies to the RF to IF channel 54. The RF to IF channel 54 uses the local oscillator signals to downconvert the frequency of the amplified GPS antenna signal to the GPS IF signal and passes the IF signal to an optional first sampler 56. The first sampler 56 synchronizes the GPS IF signal to the clock signal, quantizes the amplitude of the GPS IF signal, and issues a digital GPS IF signal to the DSP system 80. The power controller 60 shown in FIG. 1 enables power for normal mode and inhibits power for low power standby mode to the preamplifier 52, the RF to IF channel 54, the local oscillator system 58, and the first sampler 56.

Figure 3:
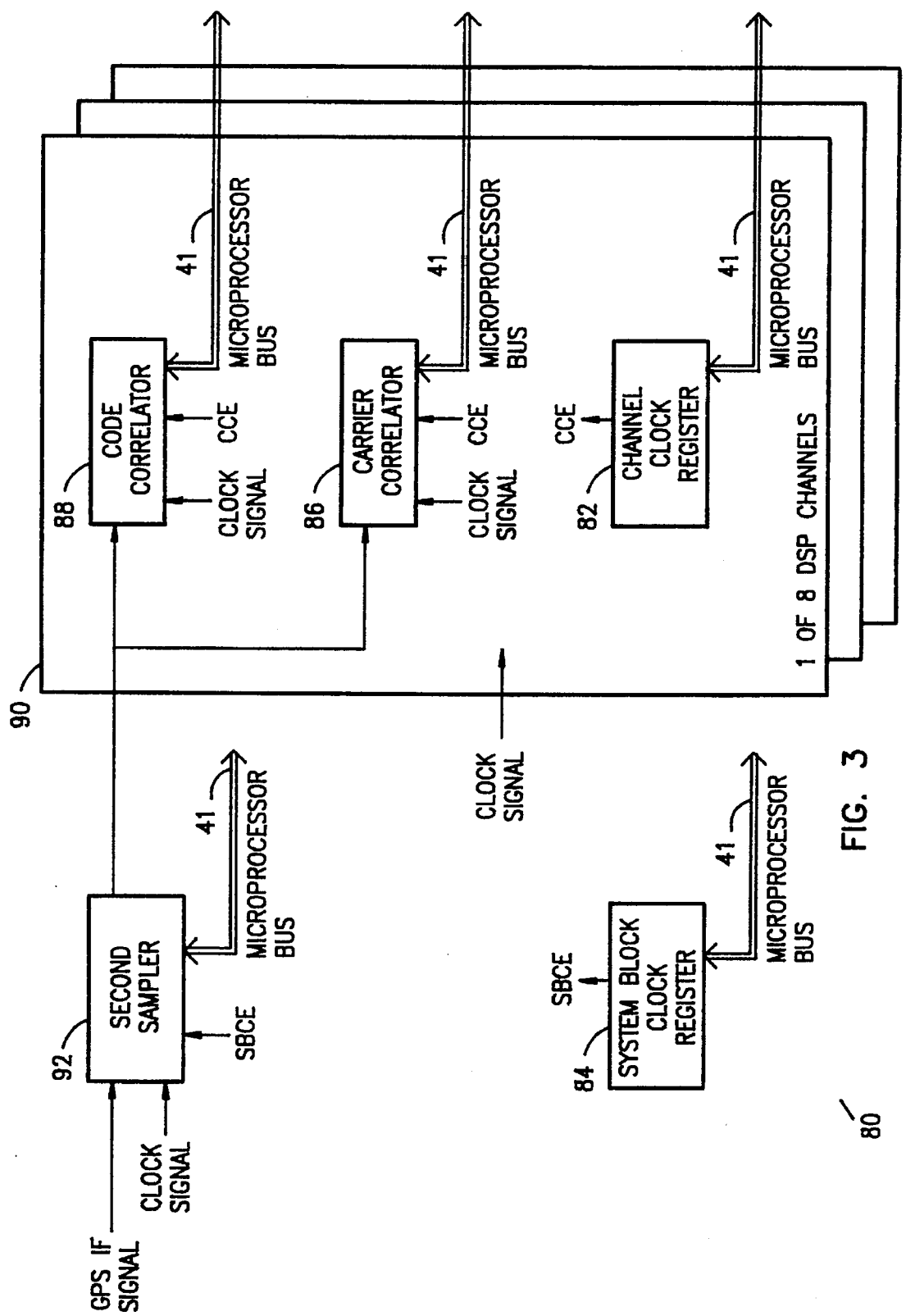
FIG. 3 is a block diagram illustrating an embodiment of a GPS Digital Signal Processing (DSP) system of the GPS receiver according to the invention.

FIG. 3 illustrates a block diagram of the Digital Signal Processing (DSP) system 80. The DSP system 80 has a normal mode where the GPS IF signal is acquired and tracked and a low power standby mode where the GPS IF signal is not acquired or tracked and where little or no power is consumed. The embodiment, the DSP system 80 uses digital integrated circuit design techniques and fabrication processes using Complementary Metal Oxide Silicon (CMOS) active devices having low quiescent power consumption when not driven by clock signals. A second sampler 92 synchronizes the GPS IF signal to the system clock signal and quantizes the amplitude of the GPS IF signal to provide a digital GPS IF signal to one or more DSP channels 90. In a preferred embodiment, the DSP system 80 includes eight (8) identical DSP channels 90 shown in FIG. 3 as 1 of 8 DSP channels 90.

The second sampler 92 may be included in each of the DSP channels 90, however since the input and the output of the second sampler 92 is common for all the DSP channels, a cost savings is achieved by using a single second sampler 92. The microprocessor system 40 assigns each DSP channel 90 to process the GPS satellite signals, as represented by the GPS IF signal, from one or more individual GPS satellites. The DSP channel 90 is assigned only one GPS satellite signal in parallel operation and is assigned more than one GPS satellite signal in serial operation. In serial operation the DSP channel 90 time sequences through the assigned GPS satellite signals. The DSP channel 90 includes at least one carrier correlator 86 and at least one code correlator 88 to receive the GPS IF signal, to receive the system clock signal and to correlate the carrier and code, respectively, in the GPS satellite signal as assigned by the microprocessor system 40. In a preferred embodiment, each DSP channel 90 includes four correlators, where each of the correlators is configurable by the microprocessor system 40 as a carrier correlator 86 or as a code correlator 86.

The carrier correlator 86 correlates the carrier of the GPS satellite signal to a carrier Numerically Controlled Oscillator (NCO) included in the carrier correlator 86. The microprocessor system 40 receives and processes correlation information from the carrier correlator 86 and provides digital signals to adjust the carrier NCO frequency. The code correlator 88 correlates the C/A code PRN modulation to a code NCO included in the code correlator 88 and a PRN sequence that is specified by the microprocessor system 40 in order to assign a GPS satellite signal to the DSP channel 90. The microprocessor system 40 selects the internal PRN code based upon a pre-determined algorithm and increments and decrements the start time of the internal PRN sequence until a PRN sequence and a time of start for the PRN sequence is determined. The times of start of the GPS satellite signals are processed to determine pseudoranges for the GPS satellites. Location and time of observation are computed in the microprocessor system 40 from the pseudoranges.

At least one clock enable register is controlled by the microprocessor system 40 to enable or to inhibit system clock signals in the DSP system 80. In the present embodiment a system block clock register 84 provides digital signal semaphores SBCE to enable or to inhibit the system clock signal in the second sampler 92. A second sample 94 and a channel clock register 82 provides digital signal semaphores CCE to enable or to inhibit the system clock in each of the DSP channel 90 to the code correlator 88, to the carrier correlator 86, or to both.

To enter a low power standby mode, the microprocessor system 40 controls at least one of the following: the power controller 60 to inhibit operating power at P1, P2, P3, P4, or P5, the microprocessor clock 44 to inhibit the microprocessor clock signal to the microprocessor system 40, the system block clock register 84 to inhibit the system clock signal to the second sampler 92, and the channel clock register 82 to inhibit the system clock signal to the code correlator 88 and/or the carrier correlator 86.

Figure 4:
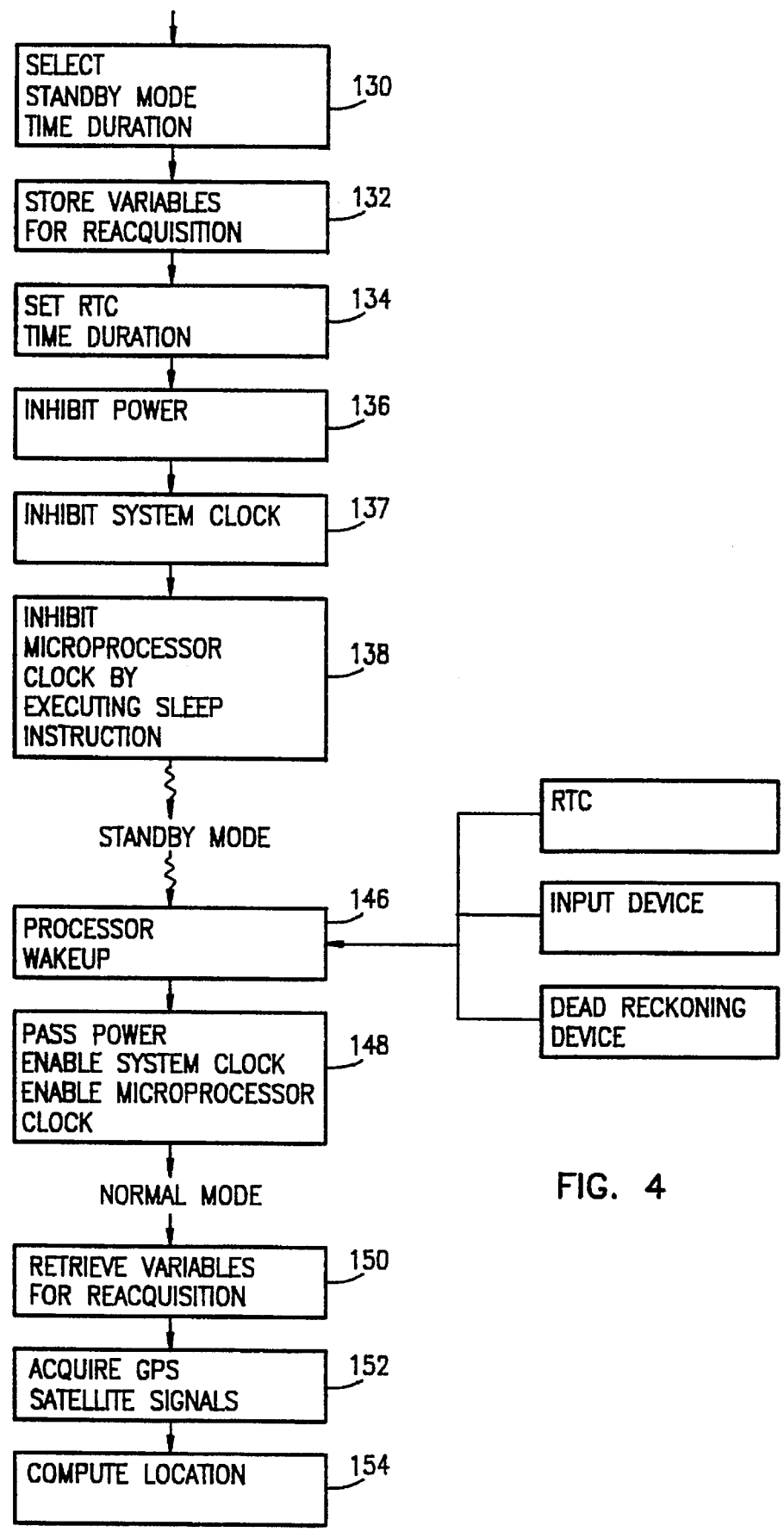
FIG. 4 is a flow chart illustrating an embodiment of a procedure to enter and to exit low power standby mode.

FIG. 4 illustrates a flow chart of a procedure to exit normal mode and enter low power standby mode, and to exit low power standby mode and enter normal mode. At the start of FIG. 4, the GPS receiver 10 is in normal mode. The steps in the procedure are controlled by the microprocessor system 40, wherein a microprocessor executes pre-coded software program instructions in a conventional manner. At step 130, the selection means 42, including pre-coded software stored in the memory in the microprocessor system 40, uses information of the intended user application of the GPS receiver 10, uses variables measured by the GPS receiver 10, and uses variables received from user input devices 18 to select a time duration for standby mode. During standby mode, location error increases as the GPS antenna 12 moves from a last location that was calculated during a previous normal mode. In general, re-acquisition in a following normal mode is faster where the GPS receiver 10 has a more accurate location.

A user application involving rapid change of location causes location error to increase rapidly during standby mode. In order to prevent a large location error from accumulating, the selection means 42 selects a short time duration if the GPS receiver 10 is intended for an aviation application, because the location of the GPS antenna 12 is expected to change rapidly during flight, thereby causing inaccuracy to accumulate rapidly during standby mode. The time duration is longer if the GPS receiver 10 is intended for vehicle use, is still longer if the GPS receiver 10 is intended for marine use, is even longer if the GPS receiver 10 is intended for pedestrian use, and is longest where the GPS receiver 10 is intended to be in a fixed location for long period of time.

One of the variables measured in the GPS receiver 10 is rate of change of location s of the GPS antenna 12. The selection means 42 selects a short time duration where the rate of change of location was high during a previous normal mode or between two successive normal modes in order to prevent large location error from accumulating during a standby mode. The selection means 42 selects a long time duration where the measured rate of change of location is low. A second variable measured in the GPS receiver 10 is GPS satellite visibility. The microprocessor system 40 maintains lists of almanac and ephemeris data for each GPS satellite. Using this data, measured location of the GPS antenna 12, and time, the microprocessor system 40 maintains a list for GPS satellites which are expected to have a line of sight and to be visible to the GPS antenna 12. The selection means 42 compares the expected satellite visibility to the GPS satellite signals actually received. When no GPS satellite signals are received, the selection means 42 assumes that the GPS receiver 10 is inside a structure, in someone's pocket, or for some other reason is unable to provide a GPS location and the selection means selects a long time duration in order to avoid depleting the batteries. A third variable measured by the GPS receiver 10 is signal consistency. When GPS satellite signals having a line of sight to the GPS antenna 12 are received intermittently instead of continuously, the selection means 42 assumes that objects are intermittently blocking a portion of the sky making the location more difficult to obtain and selects a shorter standby mode time duration in order to provide more chances to obtain the location. A fourth variable measured by the GPS receiver 10 is signal strength. When the signal strength of one or more GPS satellite signals is low, the selection means 42 selects a shorter time duration. When the signal to noise ratios are high, the selection means 42 selects a longer time duration.

The user optionally uses the input devices 18 to request a length of time duration for standby mode. The user may request none, shortest, shorter, short, medium, long, longer, longest, or other similarly understood words. The user may request a user application such as air, land, sea, or other similarly understood words. The selection means 42 selects a short time duration for air, a longer time duration for land, a still longer time duration for sea, even longer for carried, and longest if fixed. The user may request a specific length of time duration using time in units such as seconds, minutes, or hours. The user may request a location fix frequency using time in units such as seconds, minutes, or hours.

All of the intended user applications, the measured variables, and the user entered variables are considered in the selection means 42 to select the standby mode time duration. Where there is a conflict between a standby mode time duration based on intended user application and standby mode time duration based on a measured variable or a user entered variable the measured or the user entered variable will be given more weight by the selection means 42. Where there is a conflict between a measured variable and a user entered variable, the user entered variable will be given more weight by the selection means 42. The standby mode time durations selected by the selection means 42 for aviation or air are approximately in the range of 0 to 60 seconds, for vehicle or land are approximately in the range of 10 seconds to 2 minutes, for marine or sea is approximately in the range of 30 seconds to 5 minutes, for a pedestrian or carried are approximately in the range of 1 minute to 10 minutes, and for fixed is approximately in the range of 10 minutes to 2 hours.

At step 132 variables that will be used in the re-acquisition of GPS satellite signals are stored. These variables include the PRN codes for the GPS satellites that are currently being tracked in the normal mode. At step 134 the RTC 70 is given an RTC count number corresponding to the time duration for standby mode. At step 136 the power controller 60 inhibits power to at least one of the GPS antenna 12, the GPS frequency downconverter 50, the one or more input devices 18, the one or more output devices 16, and optionally one or more dead reckoning devices 20. When power is inhibited, the GPS receiver 10 enters a standby mode. At step 137, the channel clock register 82 inhibits the system clock signals in the DSP channel 90 and the system block clock register 84 inhibits the system clock signals in the second sampler 94. At step 138 the microprocessor system 40 executes a sleep instruction, inhibiting a microprocessor clock source 44 and freezing the microprocessor system 40 at its current digital states. Any one or two of steps 136, 137, and 138 may be deleted. In a typical operation, all of steps 136, 137, and 138 are implemented in order to benefit from the maximum reduction in power consumption. In the present embodiment the implementation of all the steps reduces the power consumption of the GPS receiver 10 from approximately 300 milliwatts in normal mode to less than 30 milliwatts in low power standby mode.

At step 146 the microprocessor system 40 initiates normal mode upon the receipt of a wakeup interrupt signal. Typically, the wakeup interrupt signal is generated by the RTC 70 as described in FIG. 1. Alternatively, one or more of the input devices 18 generates the wakeup interrupt signal at a request from a user. A typical input device 18 to generate a wakeup interrupt is a key switch where power is continuously connected to a first contact of the key switch. When the key switch is pressed, an electrical connection is made between the first contact and a second contact to generate the wakeup interrupt signal. Even though power is passed to the first contact during standby mode, no power is consumed or passed by the key switch until the key switch is pressed. Alternatively, a dead reckoning device 20 generates the wakeup interrupt signal when a selected limit within the dead reckoning device 20 is exceeded.

Many dead reckoning devices 20 are available to measure distance, rate of change of location, or rate of rate of change of location. An odometer measures distance by counting pulses, where each pulse corresponds to a distance traveled. In a typical example, an odometer counts revolutions of a wheel, where the corresponding distance is the circumference of the wheel. A barometer measures distance by measuring a change of barometric pressure. A calibration table converts the change of barometric pressure to a change in altitude or a vertical distance. An embodiment of a marine log measures distance by counting revolutions of a screw device that is turned by the motion of water relative to the marine log, which is typically mounted on the underside of the hull of a marine vessel. A distance measuring dead reckoning device 20, such as a barometer, altimeter, odometer, or a marine log, generates the wakeup interrupt signal when a distance limit is exceeded. An embodiment of a speedometer and an embodiment of a water speed indicator measure rate of change of location by measuring the time interval between pulses where the pulses correspond to revolutions of a wheel and turns of a screw, respectively. Another embodiment of a water speed indicator and an embodiment of an airspeed indicator measure rate of change of location by measuring the difference between two pressures where a first pressure is reduced by relative motion of water or air, respectively, and a control pressure is isolated from the relative motion. A dead reckoning device 20 that measures rate of change of location, such as a speedometer, water speed indicator, air speed indicator, or climb rate indicator generates the wakeup interrupt signal when a rate of change of location limit is exceeded. Embodiments of accelerometers and acceleration sensors measure rate of rate of change of location by measuring the change of electrical resistance in a strain transducer or by measuring the deflection of a mass against a spring. A dead reckoning device 20 that measures rate of rate of change of location, such as an accelerometer or acceleration sensor, generates the wakeup interrupt signal when a rate of rate of change of location limit is exceeded.

At step 148 the microprocessor system 40 enables the microprocessor clock source 44 and controls the power controller 60 to pass power whichever of the GPS antenna 12, the GPS frequency downconverter 50, the one or more input devices 18, the one or more output devices 16, and optionally one or more dead reckoning devices 20 that had power inhibited during standby mode. The microprocessor system 40 controls the channel clock register 82 to enable the system clock signals in the DSP channel 90 and the system block clock register 84 to enable the system clock signals in the second sampler 94. The GPS receiver 10 is now in normal mode. At step 150 the re-acquisition variables are retrieved. At step 152 GPS satellite signals are acquired. At step 154, location of the GPS antenna 12 is computed. In a typical operation microprocessor system 40 will control the power controller 60, the system block clock register 84, the channel clock register 82, and will execute the sleep instruction and receive the wakeup interrupt signal in order to continuously alternate between normal mode and standby mode using the time duration for standby mode as calculated by the selection means 42.

Although the invention has been described in terms of the presently preferred embodiment, it is to be understood that such disclosure is not to be interpreted as limiting. Various embodiments and modifications will no doubt be apparent to those skilled in the art. Accordingly, it is intended that the appended claims be interpreted as covering all alterations and modifications as fall within the true spirit and scope of the invention.

We claim:

1. A GPS receiver having a normal operational mode to process GPS satellite signals and provide GPS location information and having a low power standby mode, the GPS receiver including:

a GPS frequency downconverter to downconvert the frequency of said GPS satellite signals and to provide a GPS intermediate frequency (IF) signal;

clock signal means for providing a system clock signal;

a digital signal processing (DSP) system, coupled to the GPS frequency downconverter and the clock signal means, to operate with the system clock signal to provide correlation information corresponding to said GPS IF signal in said normal mode and to receive a control signal to enable said system clock signal for said normal mode or to inhibit said system clock signal for said standby mode;

a microprocessor system, coupled to the DSP system, to process said correlation information to provide said GPS location information;

standby mode selection means, coupled to the microprocessor system, for calculating a standby time duration for said standby mode; and the microprocessor system includes means for providing said control signal according to the standby mode selection means to cause said standby mode or said normal mode.

2. The GPS receiver of claim 1, wherein:

the microprocessor system further includes means for providing said control signal for causing the DSP system to alternate between said standby mode and said normal mode.

3. The GPS receiver of claim 1, wherein:

the microprocessor system further includes means for processing said correlation information to provide GPS variable information including at least one of (i) rate of change of location of the GPS antenna, (ii) GPS satellite visibility, (iii) GPS satellite signal consistency, and (iv) GPS satellite signal strength; and the standby mode selection means includes means for calculating said standby time duration based upon said GPS variable information.

4. The GPS receiver of claim 1, further including:

an input device, coupled to the microprocessor system, to receive a user request from a user and to pass said user request to the microprocessor system.

5. The GPS receiver of claim 4, wherein:

said user request includes a request to initiate said normal mode; and the microprocessor system includes further means for receiving said initiation request and providing said control signal to initiate said normal mode.

6. The GPS receiver of claim 4, wherein:

said user request includes a request to define said standby time duration; and the standby mode selection means includes means for calculating said standby time duration based upon said standby time duration request.

7. The GPS receiver of claim 4, wherein:

said user request includes a request for an intended user application; and the standby mode selection means includes means for calculating said standby time duration based upon said intended user application request.

8. The GPS receiver of claim 7, wherein:

said intended user application includes at least one of (i) aviation, (ii) vehicle, (iii) marine, (iv) pedestrian, and (v) fixed.

9. The GPS receiver of claim 1, further including:

dead reckoning (DR) means, coupled to the microprocessor system, for interrupting the microprocessor system to initiate said normal mode.

10. The GPS receiver of claim 9, wherein:

the DR means includes a distance measuring DR device drawn from the class consisting of an odometer, a barometer, an altimeter, or a marine log.

11. The GPS receiver of claim 9, wherein:

the DR means includes a velocity measuring device drawn from the class consisting of a speedometer, a water speed indicator, an air speed indicator, or a climb rate indicator.

12. The GPS receiver of claim 9, wherein:

the DR means includes an acceleration sensor.

13. A GPS receiver having a normal operational mode to process GPS satellite signals and provide GPS location information and having a low power standby mode, the GPS receiver including:

a GPS frequency downconverter, coupled to a GPS antenna, to downconvert the frequency of said GPS satellite signals received by said antenna and to provide a GPS intermediate frequency (IF) signal;

a digital signal processing (DSP) system, coupled to the GPS frequency downconverter to provide correlation information corresponding to said GPS IF signal;

a microprocessor clock to provide a microprocessor clock signal;

a microprocessor system, coupled to the DSP system and the microprocessor clock, including a pre-coded software sleep instruction, to operate with the microprocessor clock signal to process said correlation information to provide said GPS location information;

standby mode selection means, coupled to the microprocessor system, for calculating a standby time duration for said standby mode; and the microprocessor system includes means for executing said sleep instruction according to the standby selection means to inhibit said microprocessor clock signal to cause said standby mode.

14. The GPS receiver of claim 13 wherein:

the microprocessor system further includes means for alternating between said standby mode and said normal mode.

15. The GPS receiver of claim 13, wherein:

the microprocessor system further includes means for processing said correlation information to provide GPS variable information including at least one of (i) rate of change of location of the GPS antenna, (ii) GPS satellite visibility, (iii) GPS satellite signal consistency, and (iv) GPS satellite signal strength; and the standby mode selection means includes means for calculating said standby time duration based upon said GPS variable information.

16. The GPS receiver of claim 13, further including:

an input device, coupled to the microprocessor system, to receive a user request from a user and to pass said user request to tile microprocessor system.

17. The GPS receiver of claim 16, wherein:

said user request includes a request to initiate said normal mode; and the microprocessor system further includes means for receiving said initiation request and providing said control signal to initiate said normal mode.

18. The GPS receiver of claim 16, wherein:

said user request includes a request to define said standby time duration;

the standby mode selection means includes means for calculating said standby time duration based upon said standby time duration request.

19. The GPS receiver of claim 16, wherein:

said user request includes a request for an intended user application; and the standby mode selection means includes means for calculating said standby time duration based upon said intended user application request.

20. The GPS receiver of claim 19, wherein:

said intended user application includes at least one of (i) aviation, (ii) vehicle, (iii) marine, (iv) pedestrian, and (v) fixed.

21. The GPS receiver of claim 13, further including:

dead reckoning (DR) means, coupled to the microprocessor system, for interrupting the microprocessor system to initiate said normal mode.

22. The GPS receiver of claim 13, wherein:

the DR means includes a distance measuring DR device drawn from the class consisting of an odometer, a barometer, an altimeter, or a marine log.

23. The GPS receiver of claim 13, wherein:

the DR means includes a velocity measuring device drawn from the class consisting of a speedometer, a water speed indicator, an air speed indicator, or a climb rate indicator.

24. The GPS receiver of claim 13, wherein:

the DR means includes an acceleration sensor.

25. A GPS receiver having a normal mode to process GPS satellite signals and provide GPS location information and having a low power standby mode, the GPS receiver including:

a power controller to receive a control signal to enable or to inhibit an operating power;

a GPS frequency downconverter, coupled to the GPS antenna, to operate in said normal mode to downconvert tile frequency of said GPS satellite signals and to provide a GPS intermediate frequency (IF) signal when said operating power is enabled and to be in said standby mode when said operating power is inhibited;

a digital signal processing (DSP) system, coupled to the GPS frequency downconverter, to provide correlation information corresponding to said GPS IF signal;

a microprocessor system, coupled to tile DSP system, to process said correlation information to provide said GPS location information;

standby mode selection means, coupled to the microprocessor system, for calculating a standby time duration for said standby mode;

dead reckoning (DR) means, coupled to the microprocessor system, for interrupting the microprocessor system to initiate said normal mode; and the microprocessor system includes means for providing said control signal according to the standby mode selection means and the DR means to cause said standby mode or said normal mode.

26. The GPS receiver of claim 25, wherein:

the microprocessor system further includes means for providing said control signal for causing the GPS frequency downconverter to alternate between said standby mode and said normal mode.

27. The GPS receiver of claim 25, wherein:

the DR means includes a distance measuring DR device drawn from the class consisting of an odometer, a barometer, an altimeter, or a marine log.

28. The GPS receiver of claim 25, wherein:

the DR means includes a velocity measuring device drawn from the class consisting of a speedometer, a water speed indicator, an air speed indicator, or a climb rate indicator.

29. The GPS receiver of claim 25, wherein:

the DR means includes an acceleration sensor.

30. A GPS receiver having a normal operational mode to process GPS satellite signals passed from a GPS antenna, each satellite signal having location information, to process user input signals from user input devices, and to issue the location information to user output devices; and having a low power standby mode, the GPS receiver including:

a GPS antenna to receive GPS satellite signals from GPS satellites, to receive power, and to provide a GPS antenna signal;

a GPS frequency downconverter to receive the GPS antenna signal, to receive power, and to provide a GPS intermediate frequency (IF) signal;

a Digital Signal Processing (DSP) system to receive a system clock signal from a clock source, to receive the GPS IF signal from the GPS frequency downconverter, and to provide signals including GPS correlation information;

one or more user input devices to receive power, to receive requests, including standby time selection information, from a user, and to provide user input signals representative of the user requests;

one or more user output devices to receive power and to receive and to display user output signals;

a microprocessor system, including pre-coded software instructions, to receive a microprocessor clock signal from a microprocessor clock source, to receive the GPS correlation information from the DSP system, to receive the user input signals, to issue the user output signals representing at least one of (i) location coordinates for the GPS antenna, (ii) GPS satellite pseudoranges to the GPS antenna, (iii) rate of change of location of the GPS antenna location, and (iv) time to at least one user output device, to provide a signal representing a selected time duration for standby mode, to receive a wakeup interrupt signal, and to issue control signals;

a real time clock to receive the signal for the time duration of the standby mode and to provide a wakeup interrupt signal at the elapse of a time interval of length approximately equal to the standby time duration;

a selection means to receive standby time selection information from the microprocessor system, to process the standby time selection information, and to provide said microprocessor system with said selected time duration for standby mode;

the microprocessor system includes means to control the GPS receiver to alternate between normal mode and low power standby mode, whereby average power consumption in the GPS receiver is approximately a time weighted average of power consumption in normal mode and power consumption in standby mode;

the standby time selection information to include at least one of (i) intended user application, (ii) variables measured by the GPS receiver, and (iii) variables representing user requests;

the measured variables are drawn from the group comprising rate of change of location of said GPS antenna, GPS satellite visibility, GPS satellite signal consistency, and GPS satellite signal strength;

a power controller to receive a control signal from the microprocessor system and to respond to the control signal by inhibiting power to at least one of the following recipient devices selected from the GPS antenna, the GPS frequency downconverter, the one or more input devices, and the one or more output devices, to cause the recipient device to enter a standby mode;

one or more clock registers to receive a control signal from the microprocessor system and to respond to the control signal by inhibiting the system clock signal in the DSP system to cause the DSP system to enter a standby mode; and a sleep instruction included in the pre-coded software, the microprocessor system to inhibit operation of the microprocessor clock signal to cause the microprocessor system to enter a standby mode when the sleep instruction is executed, the microprocessor system to enable operation of the microprocessor clock signal to cause the microprocessor system to enter a normal mode when the wakeup interrupt signal is received;

whereby a low power standby mode occurs when at least one of the following events occurs: (i) the power is inhibited to at least one of the recipient devices, (ii) the system clock signal is inhibited in the DSP system, or (iii) the microprocessor clock signal is inhibited in the microprocessor system, and a normal mode, where GPS satellite signals are processed and location information provided, occurs when all of the following events occur: (i) the power is passed to all of the recipient elements, (ii) the system clock is not inhibited in the DSP system, and (iii) the microprocessor clock is not inhibited in the microprocessor system.

31. A GPS receiver having a normal operational mode to process GPS satellite signals passed from a GPS antenna, each satellite signal having location information, to process user input signals from user input devices, and to issue the location information to user output devices; and having a low power standby mode, the GPS receiver including:

a GPS antenna to receive GPS satellite signals from GPS satellites, to receive power, and to provide a GPS antenna signal;

a GPS frequency downconverter to receive the GPS antenna signal, to receive power, and to provide a GPS intermediate frequency (IF) signal;

a Digital Signal Processing (DSP) system to receive a system clock signal from a clock source, to receive the GPS IF signal from the GPS frequency downconverter, and to provide signals including GPS correlation information;

one or more user input devices to receive power, to receive requests, including standby time selection information, from a user, and to provide user input signals representative of the user requests;

one or more user output devices to receive power and to receive and to display user output signals;

a microprocessor system, including pre-coded software instructions, to receive a microprocessor clock signal from a microprocessor clock source, to receive the GPS correlation information from the DSP system, to receive the user input signals, to issue the user output signals representing at least one of (i) location coordinates for the GPS antenna, (ii) GPS satellite pseudoranges to the GPS antenna, (iii) rate of change of location of the GPS antenna location, and (iv) time to at least one user output device, to provide a signal representing a selected time duration for standby mode, to receive a wakeup interrupt signal, and to issue control signals;

a real time clock to receive the signal for the time duration of the standby mode and to provide a wakeup interrupt signal at the elapse of a time interval of length approximately equal to the standby time duration;

said wakeup interrupt signals are further provided by one of: (i) a distance measuring dead reckoning device drawn from the class consisting of an odometer, a barometer, an altimeter, or a marine log, (ii) a velocity measuring dead reckoning device drawn from the class consisting of a speedometer, a water speed indicator, an air speed indicator, or a climb rate indicator, (iii) an accelerometer or an acceleration sensor;

and including at least one of:

a power controller to receive a control signal from the microprocessor system and to respond to the control signal by inhibiting power to at least one of the following recipient devices selected from the GPS antenna, the GPS frequency downconverter, the one or more input devices, and the one or more output devices, to cause the recipient device to enter a standby mode;

one or more clock registers to receive a control signal from the microprocessor system, and to respond to the control signal by inhibiting the system clock signal in the DSP system to cause the DSP system to enter a standby mode; and a sleep instruction included in the pre-coded software, the microprocessor system to inhibit operation of the microprocessor clock signal to cause the microprocessor system to enter a standby mode when the sleep instruction is executed, the microprocessor system to enable operation of the microprocessor clock signal to cause the microprocessor system to enter a normal mode when the wakeup interrupt signal is received;

whereby a low power standby mode occurs when at least one of the following events occurs: (i) the power is inhibited to at least one of the recipient devices, (ii) the system clock signal is inhibited in the DSP system, or (iii) the microprocessor clock signal is inhibited in the microprocessor system, and a normal mode, where GPS satellite signals are processed and location information provided, occurs when all of the following events occur: (i) the power is passed to all of the recipient elements, (ii) the system clock is not inhibited in the DSP system, and (iii) the microprocessor clock is not inhibited in the microprocessor system.

\* \* \* \* \*